(12) United States Patent
Peterson et al.

(10) Patent No.: US 12,405,743 B2
(45) Date of Patent: Sep. 2, 2025

(54) HINTING INFORMATION FOR SELECTING A STORAGE LOCATION FOR A DATASET

(71) Applicant: INTERNATIONAL BUSINESS MACHINES CORPORATION, Armonk, NY (US)

(72) Inventors: Beth Ann Peterson, Tucson, AZ (US); Clint A. Hardy, Tucson, AZ (US); Matthew G. Borlick, Tucson, AZ (US); Lokesh Mohan Gupta, Tucson, AZ (US)

(73) Assignee: International Buseness Machines Corporation, Armonk, NY (US)

( * ) Notice: Subject to any disclaimer, the term of this patent is extended or adjusted under 35 U.S.C. 154(b) by 58 days.

(21) Appl. No.: 18/507,668

(22) Filed: Nov. 13, 2023

(65) Prior Publication Data
US 2025/0156102 A1    May 15, 2025

(51) Int. Cl.
    *G06F 3/06* (2006.01)
(52) U.S. Cl.
    CPC ............ *G06F 3/065* (2013.01); *G06F 3/0604* (2013.01); *G06F 3/0683* (2013.01)
(58) Field of Classification Search
    CPC .................................................... G06F 3/06
    See application file for complete search history.

(56) References Cited

U.S. PATENT DOCUMENTS

| | | | |
|---|---|---|---|
| 7,043,619 B1 * | 5/2006 | Knight | G06F 3/067 711/170 |
| 7,190,284 B1 | 3/2007 | Dye | |
| 10,116,329 B1 | 10/2018 | Bigman | |
| 11,144,454 B2 | 10/2021 | Guyer | |
| 11,226,774 B2 | 1/2022 | Vankamamidi | |
| 11,423,158 B2 * | 8/2022 | Borlick | G06F 12/1408 |
| 11,533,063 B2 | 12/2022 | Martin | |
| 11,561,695 B1 | 1/2023 | Guyer | |
| 2004/0054858 A1 * | 3/2004 | Chandrasekaran | G06F 3/0608 707/E17.005 |
| 2009/0070356 A1 * | 3/2009 | Mimatsu | H03M 7/30 |
| 2009/0100195 A1 | 4/2009 | Barsness | |
| 2012/0166748 A1 * | 6/2012 | Satoyama | G06F 3/0685 711/E12.002 |
| 2013/0024432 A1 * | 1/2013 | Pendharkar | G06F 3/0638 707/693 |
| 2017/0039000 A1 * | 2/2017 | Feng | G06F 3/0638 |
| 2019/0065788 A1 * | 2/2019 | Vijayasankar | G06F 3/064 |
| 2022/0179570 A1 * | 6/2022 | Thakkar | G06F 3/0685 |

* cited by examiner

*Primary Examiner* — Khoa D Doan
(74) *Attorney, Agent, or Firm* — Eric W. Chesley

(57) ABSTRACT

Described are techniques for selecting compressed or non-compressed data storage using hints for a dataset. The techniques include receiving a dataset at a data storage system that manages storage location on compressed data storage and non-compressed data storage. The techniques further include determining, by the data storage system, that the dataset includes one or more hints for selecting a storage location for the dataset from one of the storage locations managed by the data storage system. The techniques further include selecting, by the data storage system, the storage location for the dataset based in part on the one or more hints and storing the dataset to the storage location.

20 Claims, 6 Drawing Sheets

HINTING INFORMATION FOR SELECTING A STORAGE LOCATION FOR A DATASET

BACKGROUND

The present disclosure relates to data storage systems, and, more specifically, to selecting a storage location managed by a data storage system.

In data storage systems, compressed data storage is a method of storing a dataset in a format that takes up less space than the original format of the dataset. The dataset is compressed prior to storage by removing redundant or unnecessary data in the dataset. Non-compressed data storage does not compress a dataset prior to storage. Rather, the dataset is stored in its original format. A determination whether to store a dataset on compressed or non-compressed data storage can be made by a data storage system based on various factors, including the availability of compressed and non-compressed data storage, the compressibility of a dataset, frequency of reads and writes of a dataset, as well as other factors.

SUMMARY

Aspects of the present disclosure are directed toward a computer-implemented method comprising receiving a dataset at a data storage system that manages storage locations on compressed data storage and non-compressed data storage. The computer-implemented method further comprising determining, by the data storage system, that the dataset includes one or more hints for selecting a storage location for the dataset from one of the storage locations managed by the data storage system. The computer-implemented method further comprising selecting, by the data storage system, the storage location for the dataset based in part on the one or more hints and storing the dataset to the storage location.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
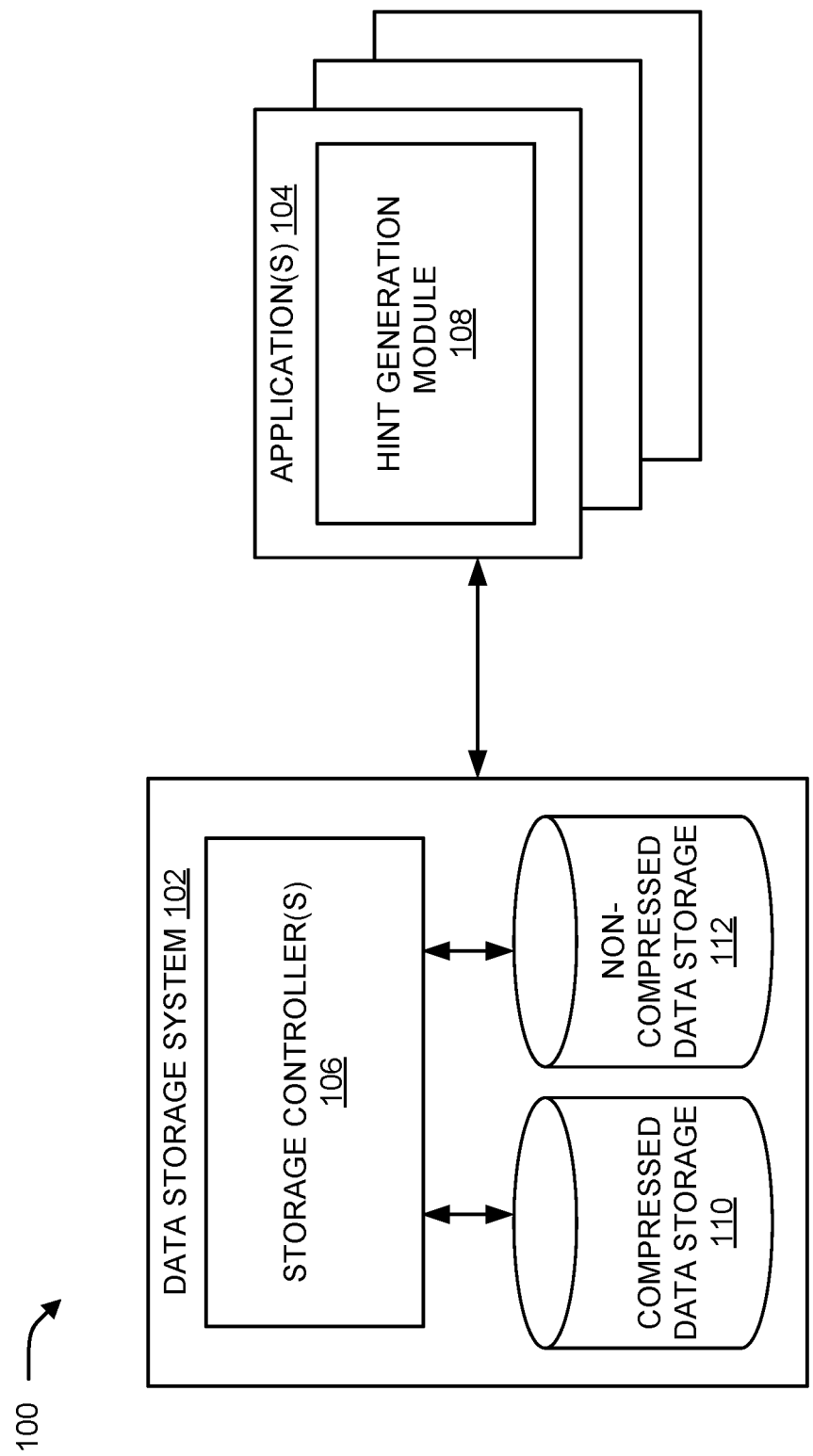
FIG. 1 is a block diagram illustrating an example computational environment implementing storing of a dataset based on hinting information, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward selecting compressed or non-compressed data storage for a dataset based on hinting information provided with the dataset. While not limited to such applications, embodiments of the present disclosure may be better understood in light of the aforementioned context.

A data storage system can include compressed data storage and non-compressed data storage. Compressed data storage (or a compressed drive) comprises a method that reduces the size of a dataset using a compression technique that, for example, encodes, restructures, or otherwise modifies the dataset, such that, information in the dataset is represented using fewer bits than the original representation of the information. Non-compressed data storage (e.g., a non-compressed drive) simply comprises storage used for storing a dataset in its original form (e.g., uncompressed and unencrypted). A dataset comprises any type and/or volume of data capable of being stored on a storage device (e.g., hard drive, solid-state drive (SSD), etc.) managed by a data storage system.

In response to receiving a dataset for storage, the data storage system makes a determination whether to store the dataset on compressed data storage or non-compressed data storage. Various factors can be used by the data storage system to make the determination, such as compressibility of the dataset, read and write frequency of the dataset, availability of compressed and non-compressed data storage, and other factors. However, there is a performance cost associated with a data storage system making a determination between compressed or non-compressed data storage. For example, the data storage system may select the wrong storage location because the data storage system may not have sufficient information about a dataset to make a correct choice (e.g., the data storage system may select compressed data storage when non-compressed data storage would have been more optimal). As a specific example, datasets that are encrypted or compressed prior to being sent to a data storage system are not good candidates for compressed data storage because further compression performed by the data storage system (or a storage device that performs in-drive compression) does not provide additional compression benefits and wastes computing resources and time used to perform the compression technique at the data storage system.

Advantageously, aspects of the present disclosure reduce the costs associated with selecting between compressed or non-compressed data storage for a dataset using hinting information. More specifically, aspects of the present disclosure provide to a data storage system one or more hints for selecting a storage location comprising compressed or non-compressed data storage. In some aspects, an application (program, client, etc.) having knowledge about the dataset (e.g., a compression state, an encryption state, read/write frequency, etc.) generates one or more hints for the dataset and sends the hint(s) along with the dataset to the data storage system. As used herein, a hint (or hinting information) comprises metadata providing information about a dataset for selecting compressed or non-compressed data storage for the dataset. The information about the dataset can include a compression state of the dataset, a compressibility of the dataset, an encryption state of the dataset, an indication how the dataset is used by an application, program, client, etc., as well as other information that can assist a data storage system in selecting one of compressed data storage or non-compressed data storage.

Accordingly, aspects of the present disclosure provide that, in response to receiving the dataset, the data storage system determines that the dataset includes one or more hints for selecting a storage location from one of the compressed or non-compressed data storage. A storage location, as used herein, can comprise an extent located on a compressed or non-compressed storage drive, the extent being a logical unit of storage space allocation made up of a number of contiguous data blocks. In response to determining that one or more hints are included with the dataset, aspects of the present disclosure select, by the data storage system using the one or more hints, a storage location on one of, the compressed, or the non-compressed, data storage managed by the data storage system. Illustratively, the data storage system can select a storage location on the compressed data storage when the one or more hints indicate that: the dataset is highly compressible, the dataset will be written frequently, and/or the dataset will be accessed infrequently. Otherwise, the data storage system can select a storage location on the non-compressed data storage when the one or more hints indicate that: the dataset is already compressed, the dataset is encrypted, the dataset has low compressibility, and/or the dataset will be read frequently. Having selected the storage location, aspects of the present disclosure store the dataset, by the data storage system, to a storage location selected from one of the compressed or non-compressed data storage. Hence, the selection of compressed and non-compressed data storage as described herein is an improvement in the technical field of data storage generally, and more particularly, in the technical field of managing compressed and non-compressed data storage by a data storage system to optimize utilization of data storage.

Referring now to the figures, FIG. 1 illustrates a block diagram of an example system environment 100 that can implement storing of a dataset based on hinting information, in accordance with some embodiments of the present disclosure. As shown, the system environment 100 can include a data storage system 102 that interfaces with one or more applications 104 to store data on compressed data storage 110 and non-compressed data storage 112.

The data storage system 102 can comprise a collection of hardware, software, and networking components that work together to store and manage data. The data storage system 102 can include multiple storage devices (e.g., hard disk drives (HDDs), solid-state drives (SSDs), optical disks, magnetic tape, etc.), redundant array of independent disks (RAID), and storage servers. The data storage system 102 includes one or more storage devices designated as compressed data storage 110 for storing compressed data, which in some embodiments can include encrypted data. A compression technique, for example, encodes, restructures, or otherwise modifies a dataset, such that, information in the dataset is represented using fewer bits than the original representation of the information, and the dataset is stored on the compressed data storage 110. Also, the data storage system 102 includes one or more storage devices designated as non-compressed data storage 112 for storing non-compressed (uncompressed) data, which in some embodiments can include unencrypted data. The data storage system 102 includes one or more storage controllers 106 that manage access to, and the flow of, data between storage devices and servers. In particular, the data storage system 102 includes a storage controller 106 that, among other things, selects a storage location for a dataset from one of compressed data storage 110 and non-compressed data storage 112, as described in greater detail below.

One or more applications 104 interface with the data storage system 102 to access and/or store data. An application 104 can comprise a computer program configured to perform one or more tasks, during which, various data operations can be performed, such as generating, modifying, storing, accessing, updating, and/or deleting datasets. A dataset comprises any type and/or any size of data capable of being stored on a storage device of the data storage system 102.

An application 104 can provide hints or hinting information for a dataset to the data storage system 102. In the illustrated example, the application 104 includes a hint generation module 108. The hint generation module 108 generates hinting information for a dataset based on the application's knowledge about the dataset, and the hint generation module 108 includes the hinting information with the dataset to allow the data storage system 102 to use the hinting information as part of an analysis that selects a storage location for the dataset from one of compressed data storage 110 and non-compressed data storage 112.

Hints or hinting information generated by the hint generation module 108 can comprise metadata that conveys information about a dataset. The hinting information can indicate one or more of: a compressibility of a dataset (e.g., high or low), a compression state of a dataset (e.g., compressed or uncompressed), an encryption state of a dataset (e.g., encrypted or unencrypted), an expected read frequency of a dataset (e.g., high, medium, low), an expected write frequency of a dataset (e.g., high, medium, low), a frequency of access of a dataset (e.g., frequently, occasionally, never), and other information that can be used by the data storage system 102 to select between compressed data storage 110 and non-compressed data storage 112.

In some embodiments, information about a dataset is derived from operations that have been performed on the dataset by the application 104 or another process. For example, the hint generation module 108 obtains information related to the utilization of the dataset from log files, utilization metrics, and other sources, and the hint generation module 108 can use this information to generate one or more hints for the dataset. In some embodiments, when information for a dataset is not available, the hint generation module 108 evaluates a dataset (e.g., evaluate a file extension, header, properties, etc.) to obtain the information (e.g., compression state and/or encryption state of the dataset) about the dataset.

In some embodiments, the hint generation module 108 automatically provides hinting information for a dataset when writing the dataset to the data storage system 102. In other embodiments, the hint generation module 108 selectively provides hinting information to the data storage system 102. In one example, the hint generation module 108 provides hinting information as part of a first time write of a dataset, and thereafter, does not include hinting information with subsequent writes of the dataset unless an aspect of the dataset changes (e.g., a change in compression state, encryption state, utilization, etc.). In another example, the hint generation module 108 determines whether to include hinting information based on the usefulness of an item of information for a dataset in relation to selecting compressed or non-compressed data storage for the dataset.

The hint generation module 108 includes hinting information for a dataset as part of a data store operation. In some embodiments, the hint generation module 108 provides the hinting information to the data storage system 102 as a prefix command (e.g., addressing and control command). In some embodiments, the hint generation module 108 uses a host command to provide hinting information for a dataset to the data storage system 102, and the host command can indicate that the hinting information applies to a range of extents or volumes selected for storing the dataset. In other embodiments, the hint generation module 108 provides hints for a dataset in the dataset's file header, or in a separate file, or in an application programing interface (API) parameter, or by using another appropriate method. Although FIG. 1 illustrates that an application 104 provides hints for a dataset to the data storage system 102, it will be appreciated that any type of computer program and/or hardware (e.g., field-programmable gate array (FPGA)) can be configured to interface with the data storage system 102 and provide hinting information for a dataset.

As mentioned earlier, the data storage system 102 includes a storage controller 106 that selects a storage location for a dataset from one of compressed data storage 110 and non-compressed data storage 112. As part of managing the storage devices of the data storage system 102, the storage controller 106 performs a storage selection analysis to determine on which of, compressed data storage 110 or non-compressed data storage 112, to store a dataset.

In some embodiments, the storage controller 106, in response to receiving a dataset, evaluates a storage state of the data storage system 102 to determine whether the storage state allows hint analysis to be performed. The storage state of the data storage system 102 indicates an amount of used space and free space on the storage devices managed by the storage controller 106. A low storage state can comprise an amount (or percentage) of free space on a storage device that is below a threshold (e.g., 2%, 5%, 10%, etc.). In cases where the storage state is low, the storage controller 106 does not perform storage selection analysis and stores the dataset on a storage device that contains free space (available space) for storing the dataset, which can be either compressed data storage 110 or non-compressed data storage 112.

After a determination that the storage state of the data storage system 102 allows selection analysis to be performed, the storage controller 106 determines whether hinting information was included with the dataset. For example, some applications that interface with the data storage system are not configured to provide hinting information for a dataset. Thus, in examples where some applications do not provide hints, the storage controller 106 checks for an indication (e.g., prefix command, host command, etc.) that hinting information is included with a dataset.

In cases where hinting information is not included with a dataset, the storage controller 106 performs a default selection analysis to select one of compressed data storage 110 or non-compressed data storage 112 for the dataset. However, performing the default analysis on the dataset by the storage controller 106 is less efficient (e.g., costly in terms of computing resources and storage space) when compared to performing hint analysis using provided hinting information because the default analysis can involve additional processing cycles and/or incorrect selections of compressed data storage 110 and non-compressed data storage 112.

In cases were hinting information is included with a dataset, the storage controller 106 performs hint analysis that analyzes the hinting information to determine whether the dataset meets one or more factors for selecting one of compressed data storage 110 and non-compressed data storage 112. In some embodiments, factors considered by the storage controller 106 for storing a dataset on compressed data storage 110 include: the dataset is highly compressible (not already compressed), the dataset is expected to be accessed infrequently by the application 104, the dataset is expected to not be accessed by the application 104 (e.g., such as when an application 104 archives a dataset to the data storage system), as well as other factors indicating an advantage for using compressed data storage. Factors considered by the storage controller 106 for storing a dataset on non-compressed data storage 112 can include: the dataset is already compressed, the dataset is encrypted, the dataset has low compressibility, the dataset is expected to be read and/or written frequently, as well as other factors indicating an advantage for using non-compressed data storage.

Also, in some embodiments, in addition to using hinting information included with a dataset to determine a storage location for the dataset, the storage controller 106 can use performance metrics for the storage devices managed by the storage controller 106 to select a storage location for the dataset. For example, storage latency, associated with storing datasets to compressed data storage 110, can be used in combination with hinting information to determine whether to store a dataset on the compressed data storage 110. When the storage latency of the compressed data storage 110 is low, the storage controller 106 may select the compressed data storage 110 because the amount of storage space saved by compressing the dataset outweighs other factors indicated by hinting information (e.g., frequent read/writes of the dataset to the data storage system 102). However, when the storage latency of the compressed data storage 110 is high, the storage controller 106 may determine that it will be more efficient to store the dataset on the non-compressed data storage 112 because the amount of storage space saved will not outweigh the high storage latency of the compressed data storage 110.

Figure 5:
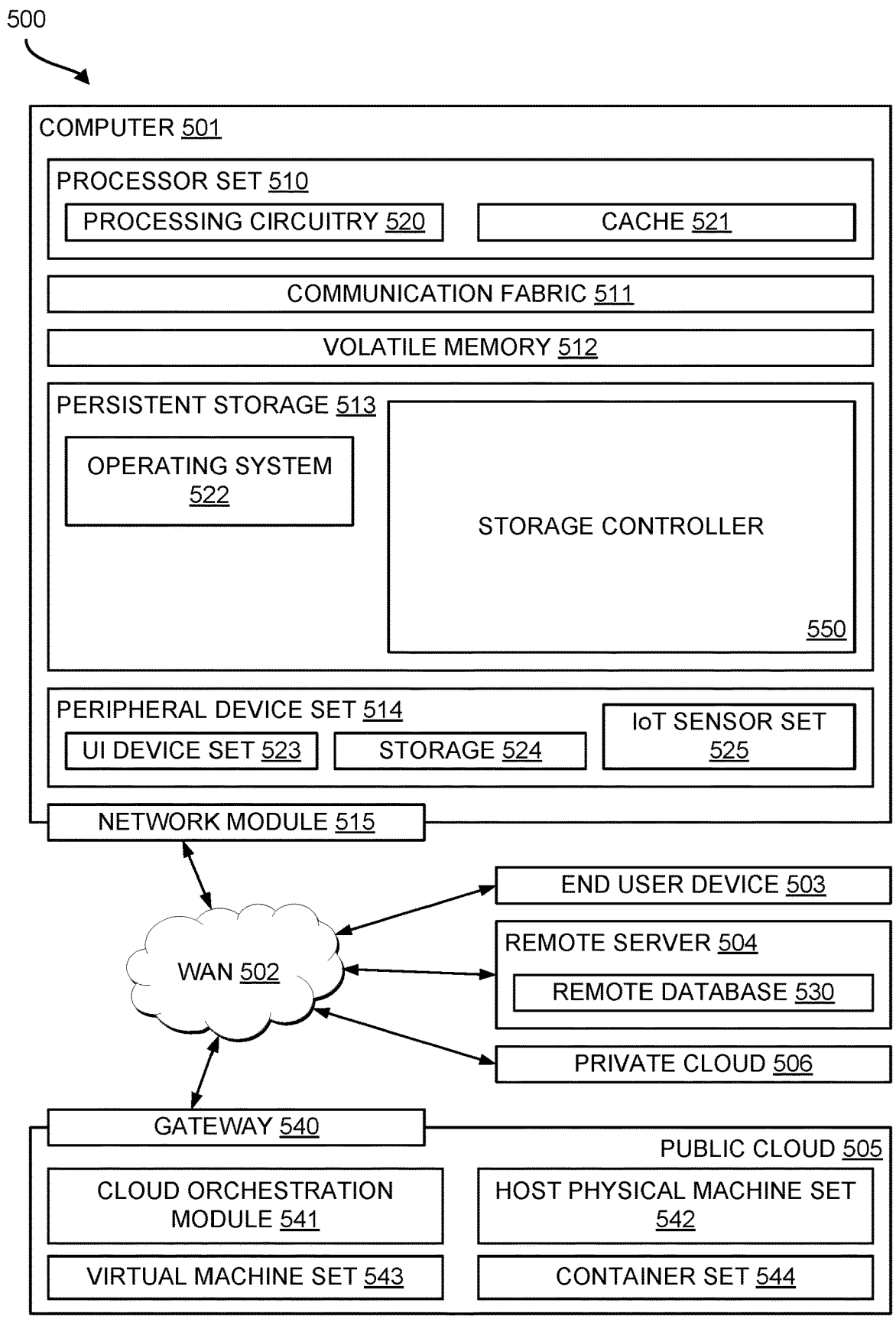
FIG. 5 is a block diagram that illustrates an example computing environment in which aspects of the present disclosure can be implemented, in accordance with some embodiments of the present disclosure.

All or a portion of the system environment 100 shown in FIG. 1 can be implemented, for example by all or a subset of the computing environment 500 of FIG. 5. Moreover, the storage controller(s) 106 and the hint generation module 108 can be implemented in software, hardware, firmware or a combination thereof. When software is used, the operations performed by the storage controller(s) 106 and the hint generation module 108 can be implemented in program instructions configured to run on hardware, such as a processor. When firmware is used, the operations performed by the storage controller(s) 106 and the hint generation module 108 can be implemented in program instructions and data and stored in persistent memory to run on a processor. When hardware is employed, the hardware can include circuits that operate to perform the operations in the storage controller(s) 106 and the hint generation module 108. A processor comprises a hardware device having hardware circuits, such as integrated circuits, that respond to and process instructions and program instructions that operate a computer. For example, a processor can be selected from at least one of a single core processor, a dual-core processor, a multi-processor core, a general-purpose central processing unit (CPU), a graphics processing unit (GPU), a digital signal processor (DSP), or some other type of processor. When a processor executes program instructions for a process, the processor can be one or more processors that are on the same computer or on different computers. In other words, the process can be distributed between processors on the same or different computers in the system environment 100.

A network can be provided to enable communication between the components of the data storage system 102 and the applications 104. The network can include any useful computing network, including an intranet, the Internet, a local area network (LAN), a wide area network (e.g., WAN 502 shown in FIG. 5), a wireless data network, or any other such network or combination thereof. Components utilized for the network can depend at least in part upon the type of network and/or environment selected. Communication over the network can be enabled by wired or wireless connections and combinations thereof.

The blocks illustrated in FIG. 1 are presented to illustrate some functional components. One or more of these blocks may be combined, divided, or combined and divided into different blocks when implemented in an illustrative embodiment. While FIG. 1 illustrates an example of a system environment that can implement the techniques above, many other similar or different environments are possible. The example environments discussed and illustrated above are merely representative and not limiting.

Figure 2A:
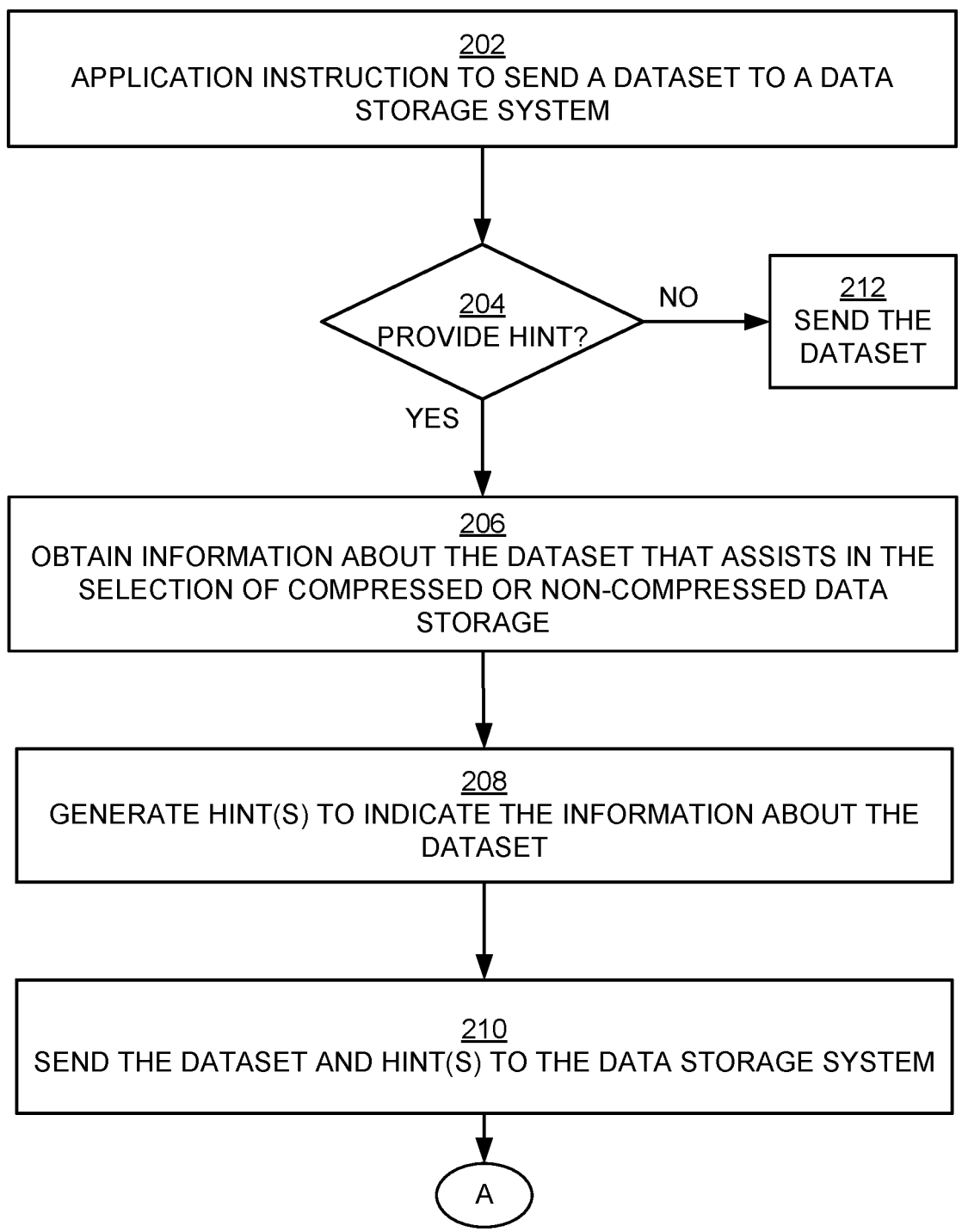
FIG. 2A is a flow diagram that illustrates an example method for generating one or more hints for a dataset, in accordance with some embodiments of the present disclosure.

Moving now to FIG. 2A, illustrated is a flow diagram for a method 200 for generating one or more hints for a dataset, in accordance with some embodiments of the present disclosure. As described below, in some embodiments, an application (or program, client, etc.) that generates and/or consumes datasets can provide hinting information for the datasets to a data storage system to assist the data storage system to select one of, a compressed, or non-compressed, data storage location for the dataset.

In operation 202, the method 200 determines to send a dataset to a data storage system that manages compressed and non-compressed data storage (e.g., the data storage system 102 described earlier in association with FIG. 1). The dataset can comprise any type and size of data (e.g., file) to be stored on a storage device managed by the data storage system.

In operation 204, in response to an instruction to send the dataset to the data storage system, the method 200 determines to provide hinting information for the dataset to the data storage system. In some embodiments, a determination by an application to provide hinting information for a dataset can be based on whether the hinting information has previously been provided to the data storage system, such that the data storage system already has the hinting information, and the data storage system has already selected a storage location for the dataset based on the hinting information. In such cases, the application may provide the hinting information to the data storage system as part of a first time write of the dataset to the data storage system, and thereafter not include the hinting information with the dataset when writing the dataset to the data storage system (as in operation 212) unless an aspect of the dataset changes, whereupon the application provides updated hinting information to the data storage system.

In some embodiments, the application automatically provides hinting information for the dataset when writing the dataset to the data storage system. In response, the data storage system can determine whether to utilize the hinting information. For example, the hinting information may be provided as part of a first time write of the dataset to the data storage system, whereupon the data storage system selects a storage location (compressed or non-compressed data storage) for the dataset based on the hinting information. Thereafter, when subsequent writes of the dataset are received, the data storage system may ignore the hinting information and store the writes of the dataset to the storage location previously selected. Alternatively, the data storage system may evaluate the hinting information to determine whether an aspect of the dataset has changed (e.g., read/write frequency) and determine whether to change the storage location used to store the dataset based on the change indicated in the hinting information.

In operation 206, the method 200 obtains information about the dataset that may assist the data storage system in selecting between compressed or non-compressed data storage for the dataset. In some embodiments, the information includes one or more of: a compressibility of the dataset, a compression state of the dataset, an encryption state of the dataset, an expected read frequency (e.g., high, medium, low) of the dataset from the data store system by the application, an expected write frequency (e.g., high, medium, low) of the dataset to the data store system by the application, and/or an indication of how often the application will be accessing the dataset (e.g., frequently, occasionally, never). As will be appreciated, other information that may assist a data storage system in selecting a compressed or non-compressed data storage location for a dataset is within the scope of the present disclosure.

In some embodiments, the application obtains the information about the dataset by way of operations that the application performs on the dataset. That is, the application may have knowledge about the dataset that stems from the application's use of the dataset (e.g., generates, transforms, etc. the dataset). For example, the application can determine a compression state and/or an encryption state of a dataset based on data compression/decompression operations and/or encryption/decryption operations performed by the application on the dataset. Also, information about a dataset may be available to the application through utilization of the dataset by the application. For example, the application can track a number of read/write operations performed by the application that store and/or access the dataset at the data storage system, and the application can determine a frequency of read and/or writes of the dataset based on the tracking. In cases where operations performed by the application on the dataset does not provide needed information about the dataset, the application can evaluate the dataset (e.g., evaluate a file extension, header, properties, etc.) to obtain the needed information (e.g., compression state and/or encryption state of the dataset).

In operation 208, the method 200 generates one or more hints to indicate the information about the dataset obtained in operation 206. The one or more hints (or hinting information) can comprise metadata that conveys the information about the dataset. In some embodiments, the method 200 can generate a hint for each item of information obtained in operation 206 that may assist the data storage system in selecting between a compressed or non-compressed data storage location for the dataset. As a non-limiting example, a hint can be generated for one or more of: a compressibility of the dataset, a compression state of the dataset, an encryption state of the dataset, an expected read frequency of the dataset, an expected write frequency of the dataset, and/or a frequency of access of the dataset. Whether a hint is generated for a particular item of information may be dependent on the existence of the information and/or a usefulness of the item of information to a data storage system in selecting compressed or non-compressed data storage for the dataset.

Figure 2B:
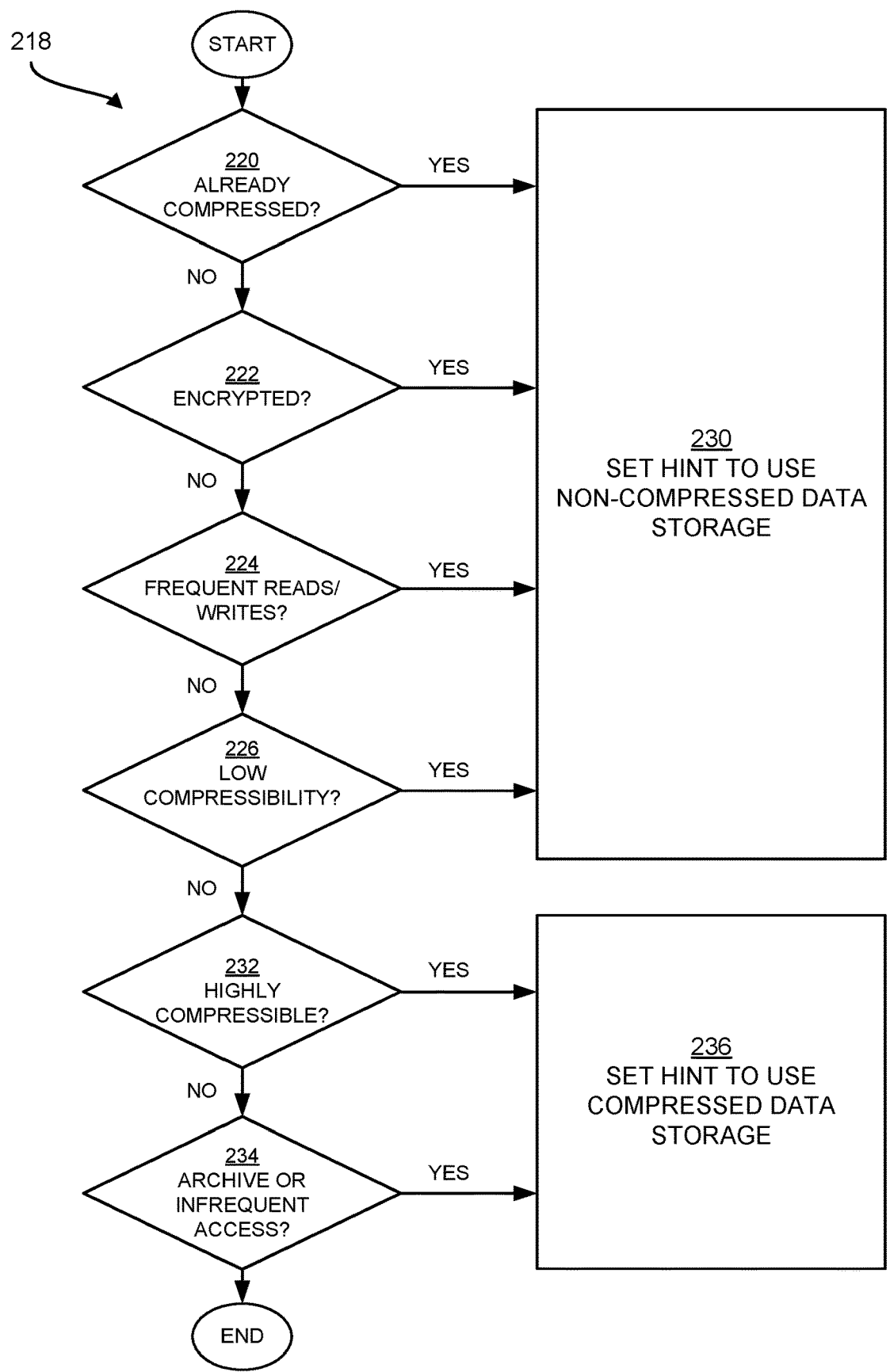
FIG. 2B is a flow diagram illustrating an example method for assigning a hint to a dataset, in accordance with some embodiments of the present disclosure.

FIG. 2B illustrates one method 218 that can be used to assign a hint to a dataset in accordance with one embodiment of the present disclosure. The method 218 uses information about a dataset that is available to the method 218 (e.g., via log files, utilization metrics, and other sources) to assign hint information to the dataset. As shown in operations 220, 222, 224, and 226, if the information about the dataset indicates that the dataset is already compressed, encrypted, is expected to be read/written frequently, or has low compressibility, then in operation 230, a hint for the dataset is set to use non-compressed data storage. As shown in operations 232 and 234, if the information about the dataset indicates that the dataset is highly compressible, or will be archived, or is expected to be accessed infrequently, then in operation 236, a hint for the dataset is set to use compressed data storage. As will be appreciated, the rules set illustrated in FIG. 2B is merely one example of a rule set for assigning hints to datasets. Other rule sets for assigning hints to datasets are within the scope of the present disclosure.

Returning to FIG. 2A, the method 200 in operation 210 sends the dataset and the one or more hints to the data storage system to assist the data storage system in selecting compressed or non-compressed data storage for the dataset. In some embodiments, the hinting information for the dataset can be provided to the data storage system as a prefix command (e.g., addressing and control command). In some embodiments, a host command can be used to provide the hinting information for the dataset to the data storage system, and the host command can indicate that the hinting information applies to a range of extents or volumes selected for storing the dataset. Moreover, in some embodiments, the hints can be included with the dataset in the dataset's file header, in a separate file, in an API parameter, etc. As will be appreciated, providing hinting information for a dataset using other techniques is within the scope of the present disclosure. The flow from operation 210 to placeholder A shown in FIG. 2A does not represent an operation of the method 200, but serves to connect operation 210 in FIG. 2A with operation 302 in FIG. 3.

Figure 3:
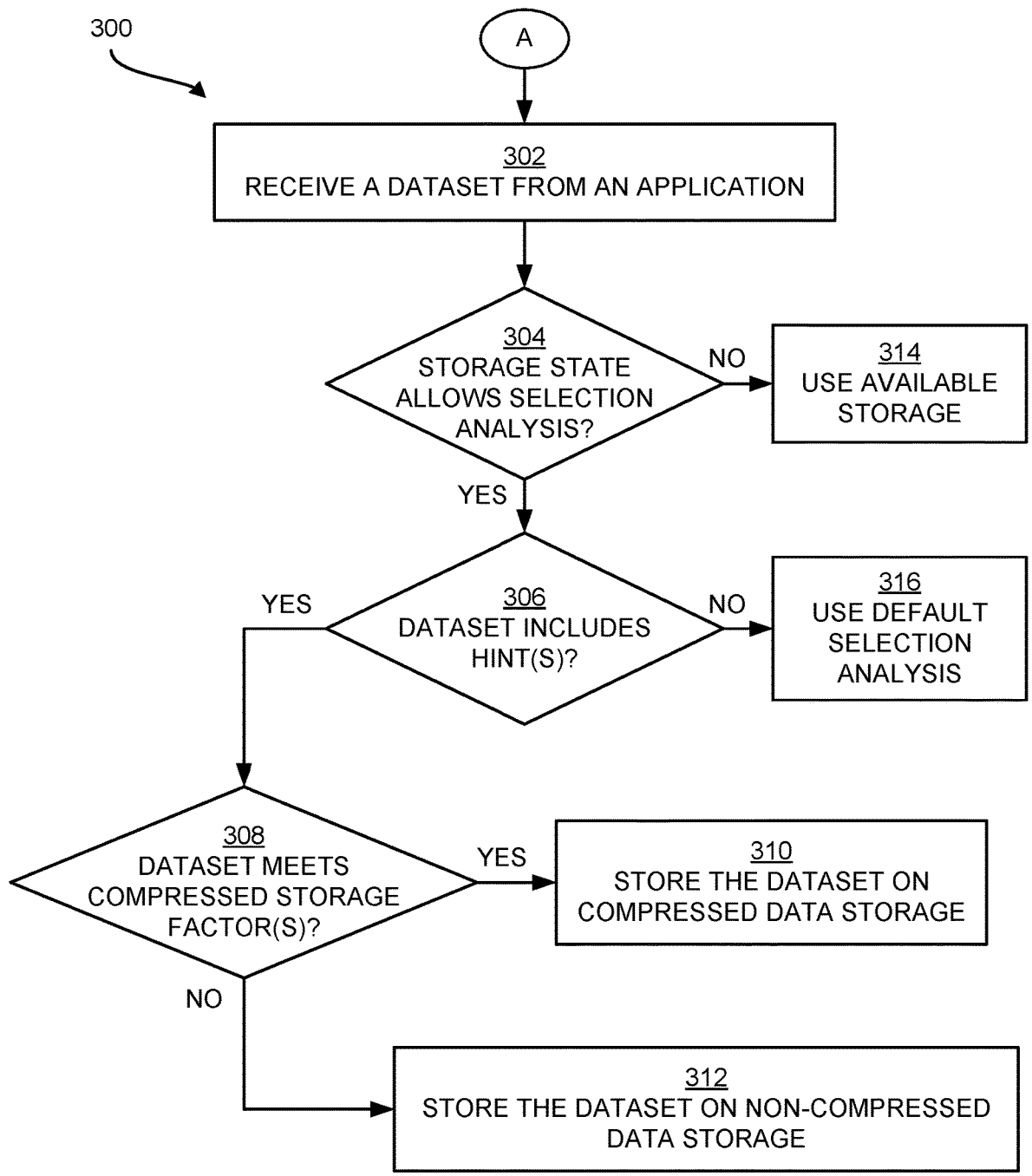
FIG. 3 is a flow diagram illustrating an example method for selecting between compressed data storage and non-compressed data storage for a dataset, in accordance with some embodiments of the present disclosure.

FIG. 3 is a flow diagram that illustrates an example method 300 for selecting between compressed data storage and non-compressed data storage for a dataset, in accordance with some embodiments of the present disclosure. As described earlier, a data storage system manages storage media (e.g., hard drive, solid-state drive (SSD), etc.) designated as compressed data storage and non-compressed data storage, where the compressed data storage employs a compression technique to reduce the size of a dataset, and the non-compressed data storage is used for storing a dataset in its original form (e.g., uncompressed and unencrypted).

FIG. 3 shows a flow from placeholder A to operation 302. The placeholder A does not represent an operation of the method 300, but serves to connect the operation 210 in FIG. 2A with operation 302. In operation 302, the method 300 receives a dataset from an application (or program, client, etc.). In response to receiving the dataset, the method 300, in operation 304, determines whether a storage state of the data storage system allows hint analysis to be performed. A storage state of a data storage system comprises an amount (e.g., a percentage) of used space and free space on compressed and un-compressed data storage devices managed by the data storage system. A low storage state can comprise an amount (or percentage) of free space on a storage device that is below a threshold (e.g., 2%, 5%, 10%, etc.). In scenarios where the storage state is low, the data storage system can forgo storage location analysis and, in operation 314, store the dataset on a storage device that contains free space (available space) for storing the dataset. As a non-limiting example, in a scenario where the storage state of compressed data storage is critically low on free space, the data storage system can store the dataset on non-compressed data storage, assuming that the storage state of the non-compressed data storage allows the dataset to be stored to the non-compressed data storage. In a reverse scenario where the storage state of non-compressed data storage is critically low on free space, the data storage system can store the dataset on compressed data storage if the storage state of the compressed data storage allows the dataset to be stored to the compressed data storage.

After a determination that the storage state of the data storage system allows selection analysis to be performed, the method 300, in operation 306, then determines whether hinting information is included with the dataset. As described in association with FIG. 2A, some applications that interface with the data storage system are configured to provide hinting information for a dataset; however, in some embodiments, other applications that interface with the data storage system may not be configured to provide hints. Thus, in examples where some applications may not provide hints, the data storage system checks for an indication (e.g., prefix command, host command, etc.) that hinting information is included with a dataset. Also, in some embodiments, hinting information can be provided in a dataset's file header, in a separate file, in an API parameter, or using any another appropriate method.

In a scenario where hinting information is not included with a dataset, the method 300 in operation 316 can use a default selection analysis to select a storage location for the dataset. Illustratively, a data storage system can perform default analysis that evaluates free space of the compressed and non-compressed data storage, evaluates the compressibility of the dataset, evaluates read/write statistics collected for the dataset by the data storage system over a time period, etc. However, performing the default analysis on the dataset by the data storage system is less efficient (e.g., costly in terms of computing resources) as compared to obtaining the dataset information from hinting information included with the dataset. For example, performing the default analysis to obtain the dataset information involves more processing cycles as compared to a number of processing cycles used to obtain the information from a hint provided with the dataset. As an example, the number of processing cycles used to determine compressibility of a dataset via analysis performed by the data storage system is greater than a number of processing cycle used by the data storage system to obtain the same compressibility information from a hint included with the dataset. As such, performing the default analysis by the data storage system is more costly in terms of computing resource utilization than that of obtaining the information from a hint included with a dataset. Consequently, performance of the data storage system is improved when an application provides hinting information with a dataset that assists the data storage system in selecting between compressed and non-compressed data storage.

In response to a determination that hinting information is included with the dataset, the method 300 in operation 308 performs hint analysis that analyzes the hinting information to determine whether the dataset meets one or more factors for selecting compressed data storage for the dataset. Factors for storing a dataset on compressed data storage can include: the dataset is highly compressible (not already compressed), the dataset is expected to be accessed infrequently by the application, the dataset is expected to not be accessed by the application (e.g., such as when an application archives a dataset to the data storage system), as well as other factors indicating an advantage for using compressed data storage. In the case that the hinting information indicates that the dataset meets the one or more factors for selecting the compressed data storage, the method 300 in operation 310 stores the dataset on the compressed data storage (i.e., an extent of free space on a storage device designed or designated as compressed data storage). Storing the dataset on the compressed data storage can involve performing a compression technique that, for example, encodes, restructures, or otherwise modifies the dataset, such that, information in the dataset is represented using fewer bits than the original representation of the information. In the case that the dataset does not meet the one or more factors for selecting the compressed data storage (as indicated by the hinting information), the method 300 in operation 312 stores the dataset on the non-compressed data storage (i.e., an extent of free space on a storage device designated as non-compressed data storage).

In some embodiments, the method 300 can include a non-compressed selection analysis (not shown). For example, in place of, or in addition to, a determination whether a dataset meets one or more factors for selecting compressed data storage, the method 300 evaluates the hinting information to determine whether the dataset meets one or more factors for selecting non-compressed data storage for the dataset. Factors for storing a dataset on non-compressed data storage can include: the dataset is already compressed, the dataset is encrypted, the dataset has low compressibility, the dataset is expected to be read and/or written frequently, as well as other factors indicating an advantage for using non-compressed data storage.

Also, in some embodiments, in addition to using hinting information included with a dataset to determine a storage location for the dataset, the method 300 can use performance metrics of the data storage system to select a storage location for the dataset. For example, a latency associated with storing data to compressed data storage can be used along with hinting information to determine whether to store a dataset on compressed data storage. As one example, in the case that hinting information indicates that a dataset is highly compressible, but also indicates that the dataset is expected to be written and/or read frequently, the method 300 can evaluate read/write metrics for the data storage system's compressed data storage to determine whether a storage latency associated with compressing and decompressing data is low enough that it would be more efficient to store the dataset on the compressed data storage as compared to storing the dataset on non-compressed data storage (e.g., the amount of storage space saved by compressing the dataset outweighs the storage latency associated with compressing and decompressing the dataset). The reverse outcome may be possible when the storage latency related to data compression is too high. For example, although the dataset is highly compressible, the method 300 may determine that it would be more efficient to store the dataset on the non-compressed data storage because the amount of storage space that can be saved by compressing the dataset does not outweigh an amount of wasted time resulting from the storage latency associated with storing the dataset on the compressed data storage.

Figure 4:
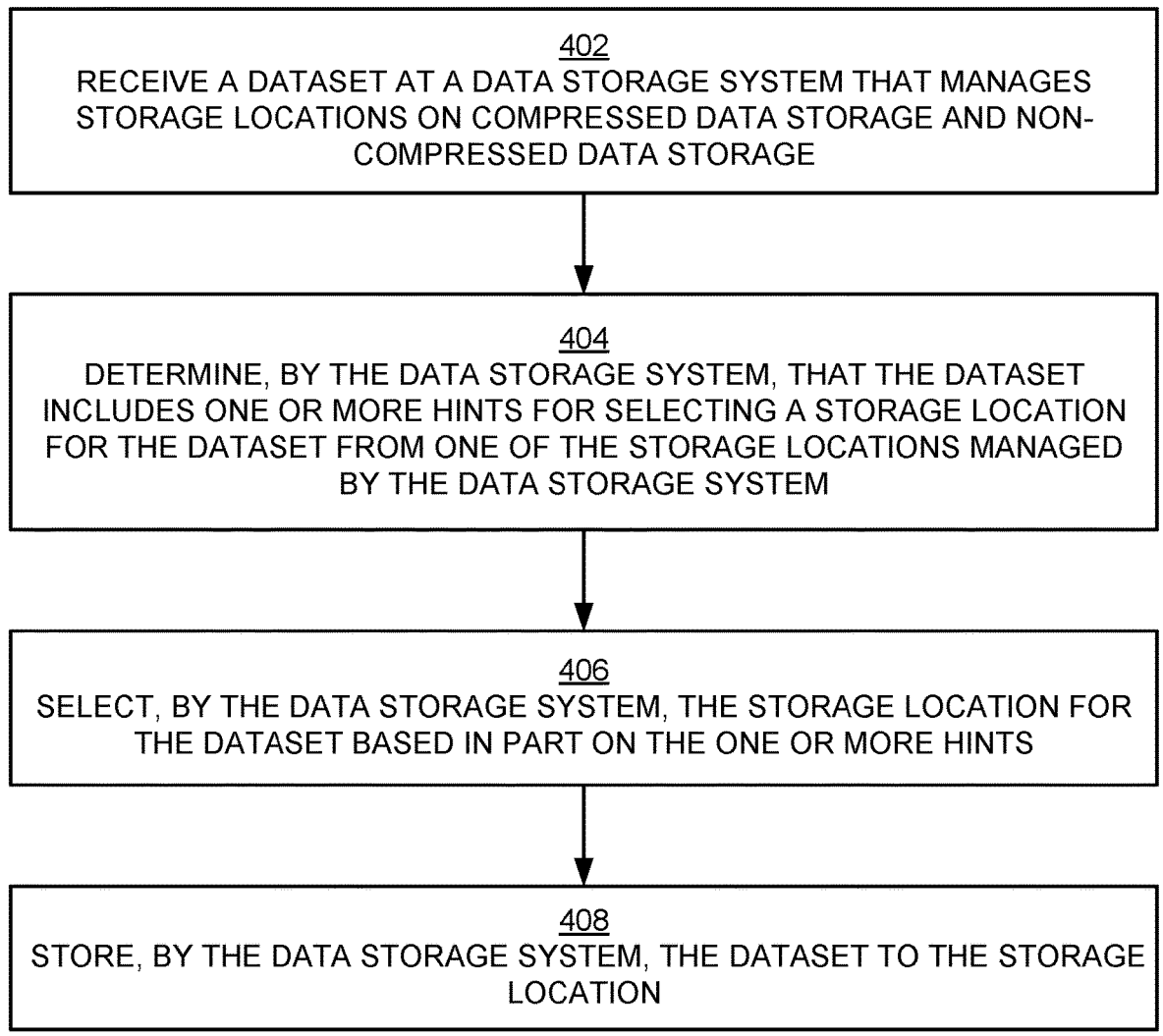
FIG. 4 is a flow diagram that illustrates another example method for selecting a storage location for a dataset using hinting information, in accordance with some embodiments of the present disclosure.

FIG. 4 is a flow diagram illustrating another example method 400 for selecting a storage location for a dataset using hinting information, in accordance with some embodiments of the present disclosure. In operation 402, a data storage system that manages storage locations on compressed data storage and non-compressed data storage receives a dataset for storage by the data storage system. In some embodiments, the dataset and the one or more hints are received from an application that, prior to sending the dataset to the data storage system, generates the one or more hints to assist the data storage system in selecting the storage location for the dataset, as described earlier.

In response to receiving the dataset, the data storage system, in operation 404, determines that the dataset includes one or more hints for selecting a storage location for the dataset from one of the storage locations managed by the data storage system, namely the compressed data storage and the non-compressed data storage. A hint can indicate a compression state of the dataset, a compressibility of the dataset, an encryption state of the dataset (i.e., encrypted or unencrypted), how the dataset is used by an application (e.g., frequent or infrequent reads and/or writes, long-time storage, etc.), or any other information that can be used in determining whether to store a dataset on compressed data storage or non-compressed data storage.

In operation 406, the data storage system selects the storage location for the dataset based in part on the one or more hints and, in operation 408, stores the dataset to the storage location. For example, the data storage system performs hint analysis that analyzes the one or more hints to determine whether the dataset meets one or more factors for selecting one of, the compressed data storage, or the non-compressed data storage. In some embodiments, the hint analysis comprises: selecting the compressed data storage when the one or more hints indicates one or more of, the dataset is highly compressible, the dataset is expected to be accessed infrequently by the application, and/or the dataset is expected to not be accessed by the application; and selecting the non-compressed data storage when the one or more hints indicates one or more of, the dataset is already compressed, the dataset is encrypted, the dataset has low compressibility, the dataset is expected to be written frequently by the application, and/or the dataset is expected to be read frequently by the application. Also, in some embodiments, selecting the storage location further includes evaluating performance metrics of the data storage system (e.g., storage latency associated with storing datasets to compressed data storage) with the one or more hints to identify the storage location.

In some embodiments, prior to performing hint analysis, the data storage system evaluates the states (e.g., used space, free space, performance, etc.) of the compressed data storage and the non-compressed data storage to determine whether the states of the compressed data storage and the non-compressed data storage allow selection of the storage location based in part on the one or more hints. If the state of either of the compressed data storage and the non-compressed data storage do not allow hint analysis to be performed, then the data storage system uses a default analysis to select a storage location (e.g., select a storage location containing free space to store the dataset).

The methods illustrated and described above can be performed by a computer (e.g., computer 501 in FIG. 5), performed in a cloud environment (e.g., clouds 506 or 505 in FIG. 5), and/or generally can be implemented in fixed-functionality hardware, configurable logic, logic instructions, etc., or any combination thereof. In some alternative implementations, the function or functions noted in the illustrated blocks can occur out of the order noted in the figures. For example, in some cases, two blocks shown in succession can be performed substantially concurrently, or the blocks may sometimes be performed in the reverse order, depending upon the functionality involved. Also, other blocks can be added in addition to the blocks illustrated in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as transitory in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the disclosed methods, such as computer code in block 550 for selecting compressed or non-compressed data storage for a dataset based on hinting information provided with the dataset. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 521 and the other storage media discussed below. The computer readable program instructions, and associated data, are accessed by processor set 510 to control and direct performance of the disclosed methods. In computing environment 500, at least some of the instructions for performing the disclosed methods may be stored in block 550 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in block 550 typically includes at least some of the computer code involved in performing the disclosed methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the disclosed methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A computer-implemented method comprising:
receiving a dataset at a data storage system that manages storage locations on compressed data storage and non-compressed data storage;
determining, by the data storage system, that a storage state of the data storage system allows using hint analysis for selecting a storage location for the dataset;
determining, by the data storage system, that the dataset includes one or more hints for selecting the storage location for the dataset from one of the storage locations managed by the data storage system;
selecting, by the data storage system, the storage location for the dataset based in part on the one or more hints; and
storing, by the data storage system, the dataset to the storage location selected by the data storage system.

2. The computer-implemented method of claim 1, wherein the dataset and the one or more hints are received from an application that, prior to sending the dataset to the data storage system, generates the one or more hints to assist the data storage system in selecting the storage location for the dataset.

3. The computer-implemented method of claim 1, wherein determining the storage state of the storage system further comprises evaluating states of the compressed data storage and the non-compressed data storage to determine whether the states of the compressed data storage and the non-compressed data storage allow selection of the storage location based in part on the one or more hints.

4. The computer-implemented method of claim 1, wherein a hint of the one or more hints indicates a compression state of the dataset.

5. The computer-implemented method of claim 1, wherein a hint of the one or more hints indicates a compressibility of the dataset.

6. The computer-implemented method of claim 1, wherein a hint of the one or more hints indicates an encryption state of the dataset.

7. The computer-implemented method of claim 1, wherein a hint of the one or more hints indicates how the dataset is used by an application.

8. The computer-implemented method of claim 7, wherein selecting the storage location further comprises:
selecting the compressed data storage when the one or more hints indicates one or more selected from a group consisting of: the dataset is highly compressible, the dataset is expected to be accessed infrequently by the application, and the dataset is expected to not be accessed by the application; and
selecting the non-compressed data storage when the one or more hints indicates one or more selected from a group consisting of: the dataset is compressed, the dataset is encrypted, the dataset has low compressibility, the dataset is expected to be written frequently by the application, and the dataset is expected to be read frequently by the application.

9. The computer-implemented method of claim 1, wherein selecting the storage location further comprises evaluating performance metrics of the data storage system with the one or more hints to identify the storage location.

10. A system comprising:
one or more computer readable storage media storing program instructions and one or more processors which, in response to executing the program instructions, are configured to:
receive a dataset at a data storage system that manages storage locations on compressed data storage and non-compressed data storage;
determine, by the data storage system, that a storage state of the data storage system allows using hint analysis for selecting a storage location for the dataset;
determine, by the data storage system, that the dataset includes one or more hints for selecting a storage location for the dataset from one of the storage locations managed by the data storage system;
select, by the data storage system, the storage location for the dataset based in part on the one or more hints; and
store, by the data storage system, the dataset to the storage location selected by the data storage system.

11. The system of claim 10, wherein the program instructions configured to cause the one or more processors to determine the storage state of the storage system are further configured to cause the one or more processors to:
evaluate states of the compressed data storage and the non-compressed data storage to determine whether the states of the compressed data storage and the non-compressed data storage allow selection of the storage location based in part on the one or more hints.

12. The system of claim 10, wherein the dataset and the one or more hints are received from an application that, prior to sending the dataset to the data storage system, generates the one or more hints to assist the data storage system in selecting the storage location for the dataset.

13. The system of claim 11, wherein a hint of the one or more hints indicates one from a group consisting of: a compression state of the dataset, a compressibility of the dataset, an encryption state of the dataset, and how the dataset is used by an application.

14. The system of claim 11, wherein the program instructions configured to cause the one or more processors to select the storage location are further configured to cause the one or more processors to:
select the compressed data storage when the one or more hints indicates one or more selected from a group consisting of: the dataset is highly compressible, the dataset is expected to be accessed infrequently by an application, and the dataset is expected to not be accessed by the application; and
select the non-compressed data storage when the one or more hints indicates one or more selected from a group consisting of: the dataset is compressed, the dataset is encrypted, the dataset has low compressibility, the dataset is expected to be written frequently by the application, and the dataset is expected to be read frequently by the application.

15. The system of claim 11, wherein the program instructions configured to cause the one or more processors to select the storage location are further configured to cause the one or more processors to:
evaluate performance metrics of the data storage system with the one or more hints to identify the storage location.

16. A computer program product comprising:
one or more computer readable storage media, and program instructions collectively stored on the one or more computer readable storage media, the program instructions configured to cause one or more processors to:

receive a dataset at a data storage system that manages storage locations on compressed data storage and non-compressed data storage;

determine, by the data storage system, that a storage state of the data storage system allows using hint analysis for selecting a storage location for the dataset;

determine, by the data storage system, that the dataset includes one or more hints for selecting a storage location for the dataset from one of the storage locations managed by the data storage system;

select, by the data storage system, the storage location for the dataset based in part on the one or more hints; and store, by the data storage system, the dataset to the storage location selected by the data storage system.

17. The computer program product of claim 16, wherein the program instructions configured to cause the one or more processors to determine the storage state of the storage system are further configured to cause the one or more processors to:

evaluate states of the compressed data storage and the non-compressed data storage to determine whether the states of the compressed data storage and the non-compressed data storage allow selection of the storage location based in part on the one or more hints.

18. The computer program product of claim 16, wherein the dataset and the one or more hints are received from an application that, prior to sending the dataset to the data storage system, generates the one or more hints to assist the data storage system in selecting the storage location for the dataset.

19. The computer program product of claim 18, wherein a hint of the one or more hints indicates one from a group consisting of: a compression state of the dataset, a compressibility of the dataset, an encryption state of the dataset, and how the dataset is used by the application.

20. The computer program product of claim 18, wherein the program instructions configured to cause the one or more processors to select the storage location are further configured to cause the one or more processors to:

evaluate performance metrics of the data storage system with the one or more hints to identify the storage location.

* * * * *